United States Patent [19]
Reid et al.

[11] Patent Number: 5,103,548
[45] Date of Patent: Apr. 14, 1992

[54] METHOD AND APPARATUS FOR SECURING A TUBULAR BUSHING IN A CIRCULAR OPENING

[75] Inventors: Leonard F. Reid, Bellevue; Roger T. Bolstad, Seattle, both of Wash.

[73] Assignee: Fatigue Technology, Inc., Seattle, Wash.

[21] Appl. No.: 698,943

[22] Filed: May 13, 1991

[51] Int. Cl.⁵ .............................................. B21D 39/00
[52] U.S. Cl. ........................................ 29/507; 29/523; 29/235; 29/263; 29/280
[58] Field of Search ...................... 29/451, 507, 522.1, 29/523, 235, 255, 256, 263, 264, 280, 282

[56] References Cited

U.S. PATENT DOCUMENTS

| | | | |
|---|---|---|---|
| 3,665,591 | 5/1972 | Kowal | 29/507 |
| 4,713,870 | 12/1987 | Szalvay | 29/507 X |
| 5,012,566 | 5/1991 | Getz, Jr. | 29/263 X |

Primary Examiner—Timothy V. Eley
Attorney, Agent, or Firm—Delbert J. Barnard

[57] ABSTRACT

A tubular bushing (68) is positioned into an opening (92) in a member (88). An axially split expansion sleeve (66) is placed onto a small diameter portion (54) of an extended mandrel (40). The mandrel (10) includes an increasing diameter portion (56) and a maximum diameter end portion (58) endwise from the small diameter portion (54). The maximum diameter portion (58) is sized to fit through the tubular bushing (68). The expansion sleeve (66), while on the small diameter portion (54) of the mandrel (10) can also fit through the bushing (68). The sleeve (66) is placed on the small diameter portion (54) of the mandrel (10) with its inner end (76) against the end (78) of a sleeve positioner (40). A tubular nosepiece (16) surrounds the sleeve positioner (40), and extends axially beyond the end surface (78). The mandrel (10) is inserted through the bushing (68) while the bushing (68) is within opening (92). The mandrel (10) is moved to place the sleeve (66) within the bushing (68), and an end surface (41) of the nosepiece (16) against a surface portion (84) of the workpiece (88). At the same time, the end surface (43) of a nosepiece extension (39) is positioned against an end surface (82) of the bushing (68). The mandrel (10) is then pulled through the sleeve (66). Movement of the increasing diameter portion (56) and the maximum diameter portion (58) through the sleeve (66) imposes a radially outwardly directed force on the sleeve (66), causing the sleeve (66) to expand. The expanding sleeve (66) exerts a radially outwardly directed force on the bushing (68). In response, the bushing (68) is expanded radially into a secure interference fit within the opening (92) in the workpiece (88).

19 Claims, 6 Drawing Sheets

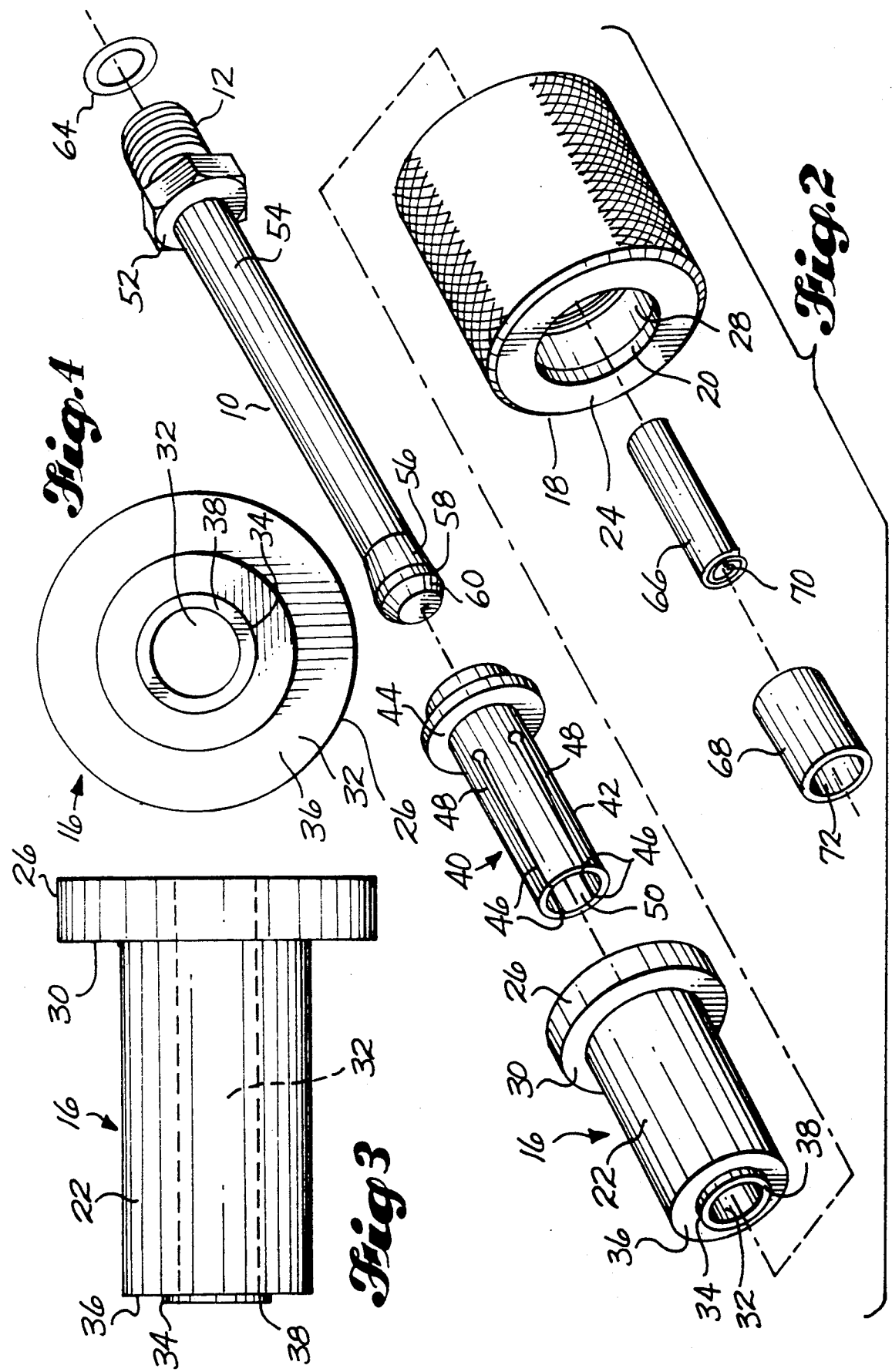

METHOD AND APPARATUS FOR SECURING A TUBULAR BUSHING IN A CIRCULAR OPENING

TECHNICAL FIELD

The present invention relates to the installation of tubular bushings in openings in structural members. More particularly, it relates to the provision of an installation method and apparatus utilizing a mandrel and a lubricated split sleeve for radially expanding the bushing to create a tight interference fit between it and the opening.

BACKGROUND INFORMATION

It is known to secure a bushing within an opening in a structural wall by positioning the bushing within the opening, holding it in place, and then forcing an expansion mandrel through the center of the bushing to radially expand the bushing into an interference fit with the opening. A lubricant must be applied to the contacting surfaces of the mandrel and bushing. If insufficient lubricant is applied, the mandrel can become stuck in the bushing. Also, the mandrel imposes an axial force on the bushing, sometimes causing undesirable galling and/or deformation of the bushing.

The principal object of the present invention is to provide a method and apparatus for causing radial expansion of a bushing with controlled axial movement of the bushing. Another object of the present invention is to use a lubricated split sleeve between the mandrel and the bushing to absorb the axial forces and permit bushing installation from one side of the workpiece. The split sleeve may be of the type disclosed in Louis A. Champoux U.S. Pat. No. 3,566,662, granted Mar. 2, 1971, or by Claim M. Harter U.S. Pat. No. 3,665,744, granted May 30, 1972. The prior art use of these split sleeves is for the cold expansion of metal immediately surrounding an opening for fatigue life enhancement.

DISCLOSURE OF THE INVENTION

According to the method, a mandrel is provided which includes, in series, a small diameter portion, an increasing diameter portion, and a maximum diameter portion. A on piece split sleeve is positioned on the small diameter portion of the mandrel. A tubular bushing having a substantially constant outside diameter and a substantially constant inside diameter is positioned on the split sleeve. The mandrel, the split sleeve and the bushing are inserted into a circular opening in a member. The split sleeve and the bushing are held in a fixed axial position within the opening and the mandrel is moved axially to move first the increasing diameter portion and then the maximum diameter portion of the mandrel axially through the sleeve. The mandrel expands the split sleeve radially and the expanding sleeve imposes a radially outwardly directed force on the bushing. The mandrel and the split sleeve are dimensioned such that the radial expansion of the split sleeve exerts sufficient radial forces on the bushing to plastically expand the bushing and place the sidewall of the opening into tight gripping contact with the outer surface of the bushing. The split sleeve is removed from the bushing after the mandrel has passed through the split sleeve. The tubular bushing is left within the opening, firmly secured to the sidewall of the opening.

In preferred form, the mandrel is pulled through the split sleeve by the use of a puller tool including a nosepiece having an outer end surface which contacts an end of the bushing and a surface portion of the member in which the opening is formed, immediately surrounding the opening. The sleeve is internally lubricated by a dry film lubricant.

Other objects, features and advantages of the invention will be hereinafter described in greater detail, as a part of the description of the best mode and the alternative embodiments of the invention.

BRIEF DESCRIPTION OF THE DRAWINGS

In the drawings, like reference numerals are used to designate like parts throughout the several views, and:

FIG. 2 is an exploded pictorial view of the assembly shown by FIG. 1;

FIG. 3 is a side elevational view of the nosepiece;

FIG. 4 is an outer end elevational view of the nosepiece;

BEST MODE FOR CARRYING OUT THE INVENTION

Figure 5:
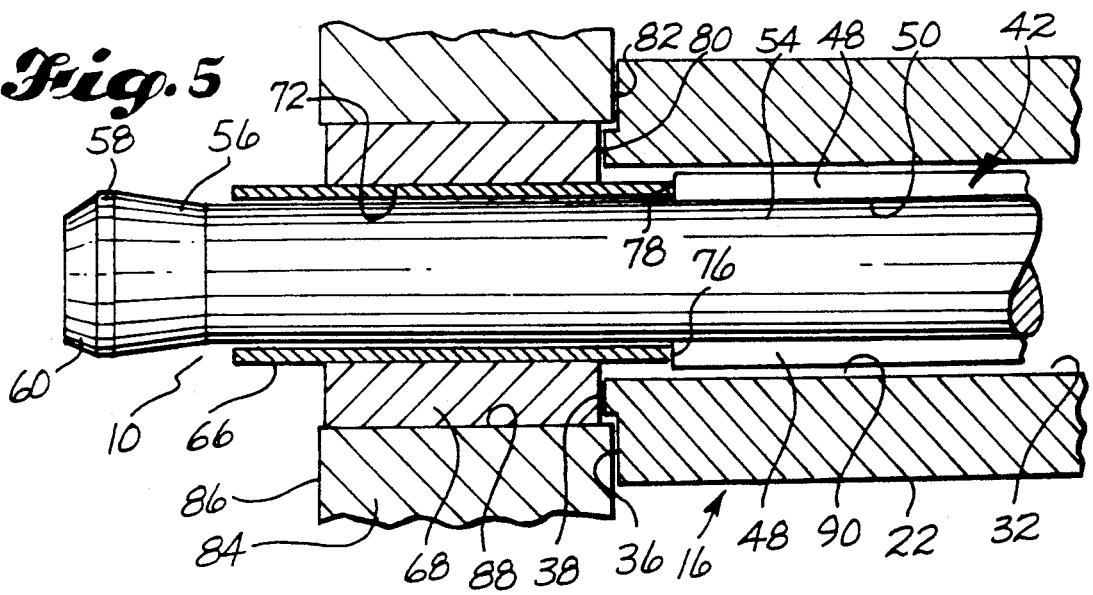
FIG. 5 is a fragmentary longitudinal sectional view showing the tooling and the bushing at the start of the method, with the mandrel being shown in side elevation.
Figure 6:
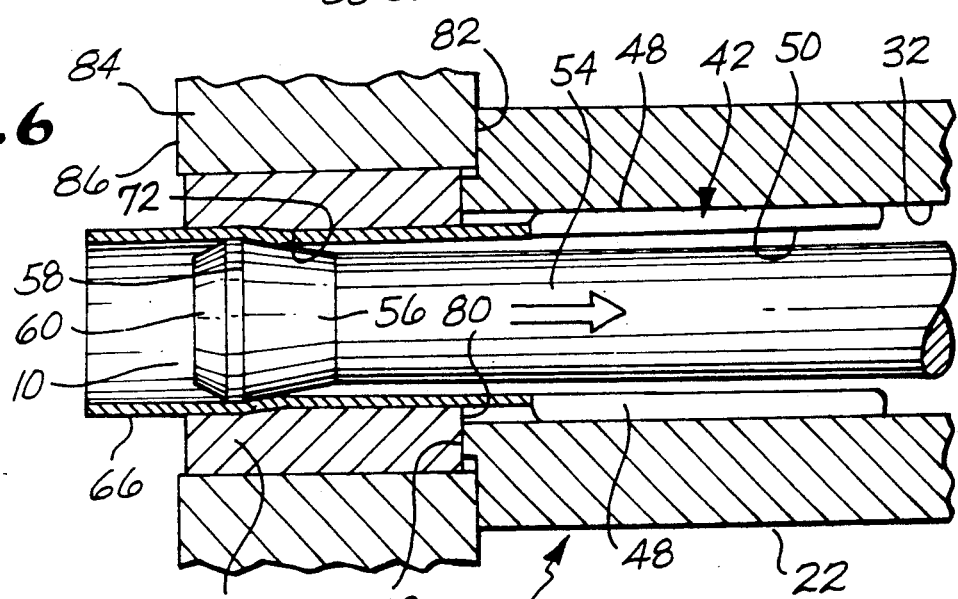
FIG. 6 is a view like FIG. 5, but showing the mandrel in the process of being pulled through the split sleeve and the bushing.
Figure 7:
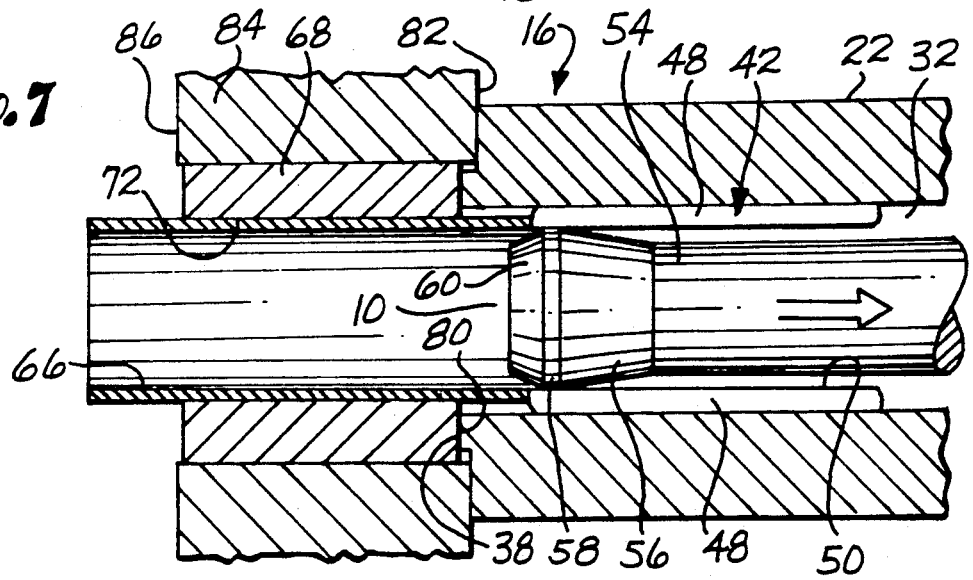
FIG. 7 is a view like FIGS. 5 and 6, showing the mandrel in a retracted position within the nosepiece of the puller tool.

Referring to FIGS. 1-4, a mandrel 10 is connected at its inner end 12 to a piston (not shown) within a puller tool 14. Puller tool 14 includes an elongated nosepiece tool 16 which is secured to an end of the puller tool 14 by means of a retainer ring 18. Ring 18 includes an end opening 20 through which an elongated tubular nose portion 22 of the nosepiece 16 extends. Opening 20 is surrounded by an annular flange 24. The nosepiece 16 includes an annular base 26 which is located within a chamber 28 (FIG. 2) in retainer ring 18, with its radial surface 30 against the radial inner surface of the flange 24. Tubular portion or body 22 projects forwardly from the annular base 26. As best shown in FIGS. 5-7, the body 22 is a one piece tubular member including a sidewall of substantial thickness. Nose portion 22 includes a central passageway 32. The outer end of nosepiece 16 include a central annular projection 34 which immediately surrounds the central passageway 32. An annular end surface 36 immediately surrounds projection 34. Projection 34 has an end surface 38 which is parallel to but spaced forwardly of annular surface 36.

A sleeve abutment 40 is positioned within the nosepiece 16. Sleeve abutment 40 includes an axially split tubular portion 42 which extends into passageway 32. An annular flange 44 (FIG. 2) is connected to the inner end of member 42. Longitudinal slits 46 (e.g. six) divide tubular member 42 into a like number of longitudinal segments 48. Tubular member 42 includes a central passageway 50.

The base of mandrel 10 includes, in series, the inner end portion 12, a flange 52, a small diameter portion 54, an increasing diameter portion 56, a maximum diameter portion 58, and a converging outer end portion 60. Flange 52 includes wrench flats by which it can be gripped by the jaws of a wrench. End portion 12 is threaded for connection to a threaded socket in the outer end of a piston portion of the puller tool 14. A wrench is applied to the wrench flats, and is turned to tighten or loosen the connection.

Figure 1:
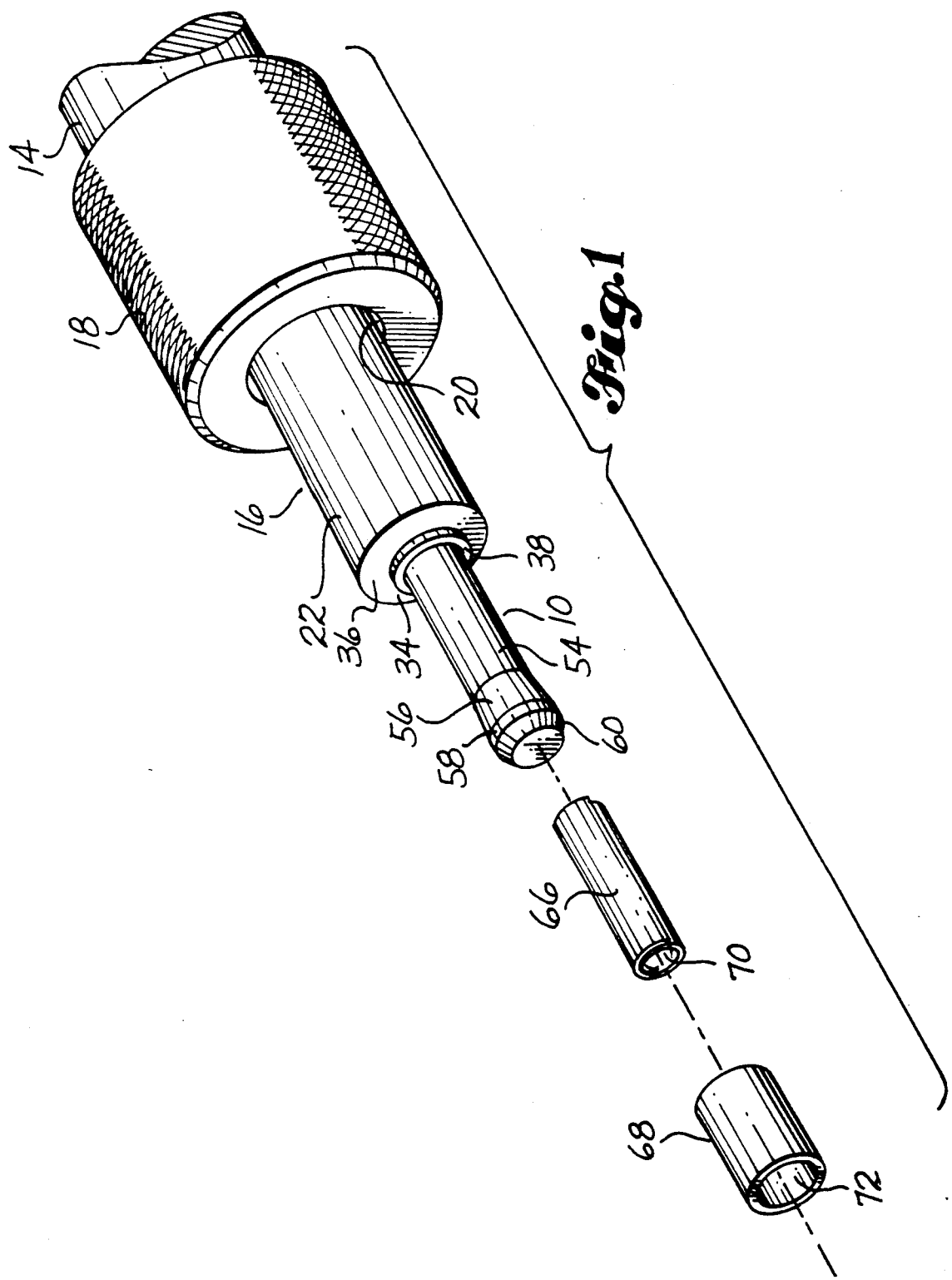
FIG. 1 is a fragmentary pictorial view taken from above and to one side of the nosepiece end of a puller tool, showing a mandrel in an extended position, and showing a split sleeve and a bushing spaced axially from the mandrel.

As shown by FIG. 1, when the piston is extended, the converging end portion 60 and the maximum and increasing diameter portions 58, 56 of the mandrel 10 are positioned endwise outwardly of the nosepiece 16. The small diameter portion 54 of the mandrel 10 extends through passageway 50 in member 40. An O-ring 64 (FIG. 4) may be positioned between flange 52 and a radial end surface of the piston.

The above-described tooling is similar to tooling that is described in detail in Louis A. Champoux U.S. Pat. No. 4,425,780, granted Jan. 17, 1984. The puller tool is disclosed in detail in Louis A. Champoux U.S. Pat. No. 4,187,708, granted Feb. 12, 1980. The contents of these patents are incorporated herein by this specific reference.

Referring to FIGS. 1 and 2, the apparatus of the invention also includes a one piece split sleeve 66 and a tubular bushing 68. Split sleeve 66 includes a center passageway 70 and bushing 68 includes a center passageway 72. As disclosed in the aforementioned U.S. Pat. No. 3,566,663, the inside of sleeve 66 is coated by a suitable film lubricant, e.g. a composition of lead oxide, graphite and molybdenum disulfide.

The puller tool 14 is operated to extend the mandrel 10 into the position shown by FIGS. 1 and 5. A split sleeve 66 is then moved endwise onto the small diameter portion 54 of the mandrel 10 (FIG. 5). The bushing 68 is then moved endwise of the mandrel 10 and onto the split sleeve 66, as also shown by FIG. 5. The split allows the split sleeve 66 to expand in diameter as it is being moved over first the converging end portion 60, then the maximum diameter portion 58, and then the increasing diameter portion 56, of mandrel 10. The split sleeve 66 acts much like a spring. The stored energy in sleeve 66 causes the sleeve 66 to contract once it is on the small diameter portion 54 of the mandrel 10.

When sleeve 66 is on the small diameter portion 54 of mandrel 10 it has an outside diameter that is smaller than the maximum diameter portion 58 of mandrel 10 and also smaller than the center passageway 72 in the bushing 68. Passageway 72 in bushing 68 is slightly larger in diameter than the maximum diameter portion 58 of mandrel 10. Thus, after the split sleeve 66 has been installed on the small diameter portion 54 of mandrel 10, the bushing 68 can be slid endwise of the mandrel 10 and positioned on the sleeve 66 (FIG. 5).

As shown by FIG. 5, split sleeve 66 extends into the nose portion 22 of nosepiece 16 and at its inner end 76 abuts the outer end 78 of sleeve positioner 40. The abutment of sleeve end 76 with sleeve positioner end 78 prevents endwise movement of the sleeve 66 into the nosepiece 16, when the mandrel 10 is being retracted. As also shown by FIG. 5, end surface 38 contacts end surface 80 of bushing 68 and surface 36 contacts surface portion 82 of wall 84. The purpose of the protrusion 34 is to hold the bushing 68 into an underflush position with respect to the surface 82. Surface 82 is on the first side of a member 84 which includes a second or opposite side 86. The bushing 68 has an outer diameter which is sized to snugly fit within an opening 88 which has been drilled in member 84. Opening 88 extends perpendicular to member 84, between the first side 82 and the second side 86.

The central passageway 32 in nose portion 22 is spaced radially outwardly from the periphery of tubular portion 42 when the small diameter portion 54 of mandrel 10 is within the tubular portion 42 of sleeve abutment 40. Thus, an annular space 90 initially exists between the tubular portion 42 and the main body of nose portion 22 (FIG. 5). The radial dimension of this space 90 is large enough to permit a radial expansion of the tubular portion 42 in response to movement of first the increasing diameter portion 56, and then the maximum diameter portion 58, of the mandrel 10, into the axially split tubular portion 42, near the end of the retraction stroke of the mandrel 10. See FIGS. 6 and 7.

The method of the invention will now be described: The split sleeve 66 is positioned on the extended mandrel 10, and the bushing 68 is positioned on the split sleeve 66, as describe above. Then, the outer end of mandrel 10 is aligned with the opening 88 and the puller unit 14 is moved towards member 84, to move the mandrel 10, sleeve 66 and bushing 68 into the opening 88. Or, bushing 68 may be first set into opening 88 followed by a movement of sleeve 66 and mandrel 10 into the bushing 68. The puller tool 14 is moved forwardly until end surface 38 on nosepiece 16 abuts end surface 80 on bushing 68 and end surface 36 abuts surface 82 of member 84. This is the position shown by FIG. 5. Next, the puller tool 14 is operated to pull or retract the mandrel 10 into the nosepiece 16. As shown by FIGS. 6 and 7, as mandrel 10 is retracted, first the increasing diameter portion 56 and then the maximum diameter portion 58 of the mandrel 10 move through the split sleeve 66. As they move, portions 56, 58 enlarge the diameter of sleeve 66. In the process, sleeve 66 imposes a radially outwardly directed force on the bushing 68. This expands bushing 68 and moves its outer surface into tight contact with the side surface of the opening 88 in member 84. The mandrel 10 and the split sleeve 66 are dimensioned such that the radial expansion of the split sleeve 66 exerts sufficient radial forces on the bushing 68 to plastically expand the bushing 68 and create a tight interference fit between the outer surface of the bushing 68 and the sidewall of the opening 88, to in that manner securely anchor the bushing 68 within the opening 88. As shown by FIG. 6, when the maximum diameter portion 58 of mandrel 10 is within split sleeve 66, the diameter of mandrel portion 58 is in effect increased by an amount equal to twice the thickness of the sidewall of split sleeve 66. In order for mandrel portion 58 to move axially through sleeve 66, the sleeve 66 must expand in diameter and the increment of diameter expansion must be transmitted to the bushing 68. The increment of diameter expansion is calculated to provide an amount of plastic expansion of the bushing 68 sufficient to secure the bushing 68 within opening 88.

As shown by FIGS. 6 and 7, when the increasing diameter and maximum diameter portions 56, 58 of mandrel 10 enter into the sleeve positioner 40, the sleeve positioner 40 increases in diameter at its outer end while maintaining the contact between its end surface 78 and the end surface 76 of the expanded sleeve 66. The presence of the longitudinal slits 46 allow the segments 48 to bend outwardly, like leaf springs, in response to the movement of mandrel portions 56, 58 into the tubular sleeve positioner 40. As previously stated, an annular passageway 90 initially exists in the tubular body of nosepiece 16, around the axially split tubular portion 42 of sleeve abutment 40. This space 90 provides expansion room into which the segments 45 move as they bend outwardly.

Figure 8:
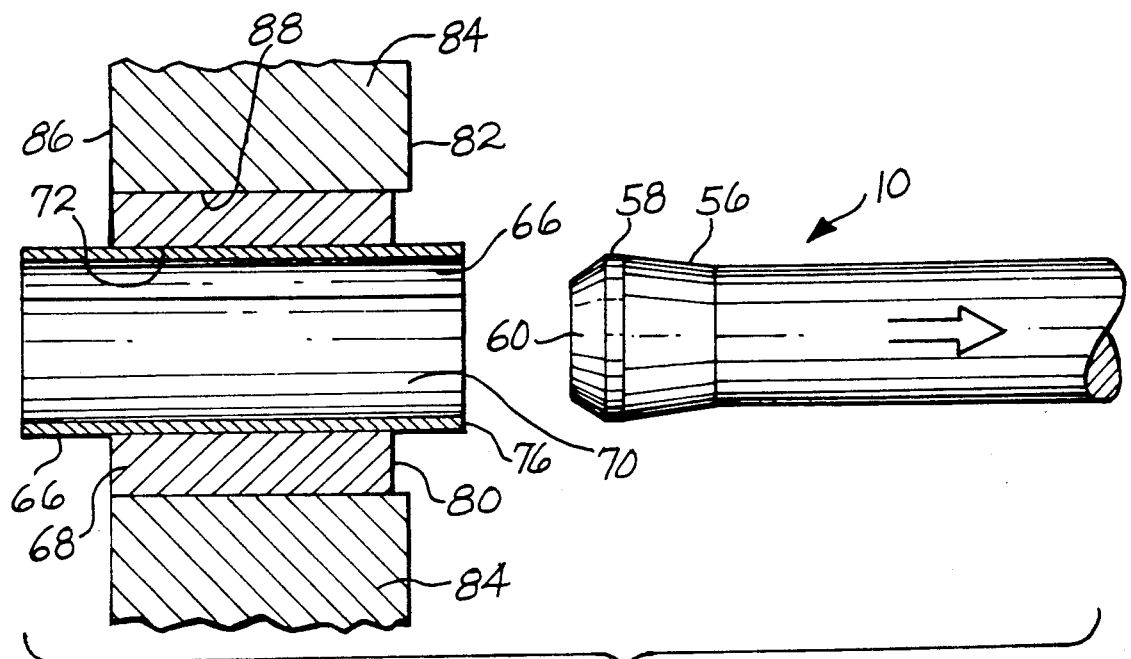
FIG. 8 is a view like FIGS. 5-7, showing the mandrel moved away from the split sleeve and the bushing, and showing the split sleeve still in the bushing.
Figure 9:
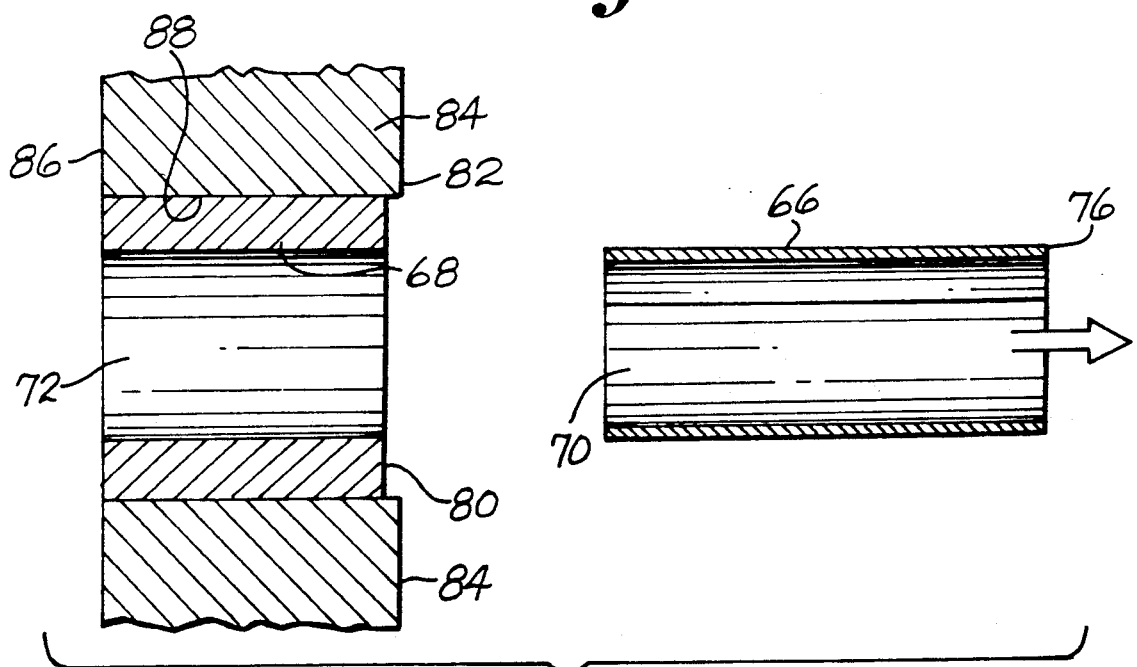
FIG. 9 is a view like FIGS. 5-8, but showing the split sleeve removed from the bushing, and showing the bushing secured in the opening.
Figure 10:
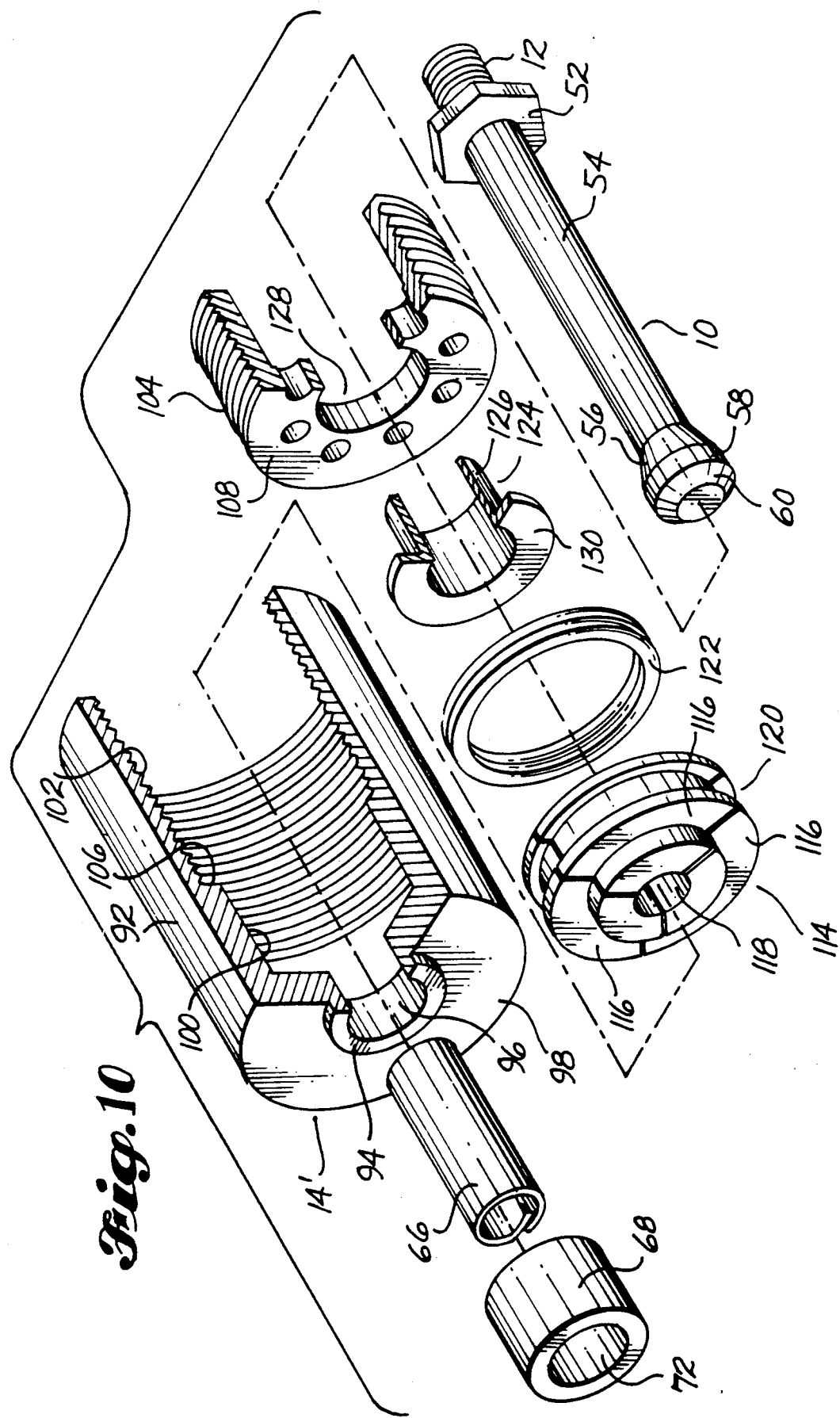
FIG. 10 is a view like FIG. 1, showing a modified embodiment of the tooling.

As shown by FIG. 8, at the completion of the movement of mandrel 10 through sleeve 66, the puller tool 14 and the mandrel 10 are moved away from the sleeve 66 and the member 84. Then, the sleeve 66 is removed from the bushing 68, leaving bushing 68 within the opening 88.

The apparatus and method which have been described permit the operator to install the bushing 68 within the opening 88 from the first side of the member 84. It is also within the scope of the invention to use a different type of puller tool which requires installation of the mandrel, the split sleeve and the bushing from the second side 86 of member 84. The sleeve 66 and the bushing 68 are placed on the small diameter portion 54 of the bushing. Then, the puller tool end of the mandrel 10 is inserted through the opening 88, from the second side 86 of the member 84. The tool end of the mandrel 10 is then connected to the piston of the puller tool 14 so that the puller tool 14 can be operated to pull the mandrel 10 through the sleeve 66 and bushing 68. It is also within the scope of the invention to use a tool which is adapted to push a mandrel through the sleeve 66 and bushing 68, to expand the sleeve 66 and the bushing 68 for securing the bushing 68 in the opening 92.

Figure 11:
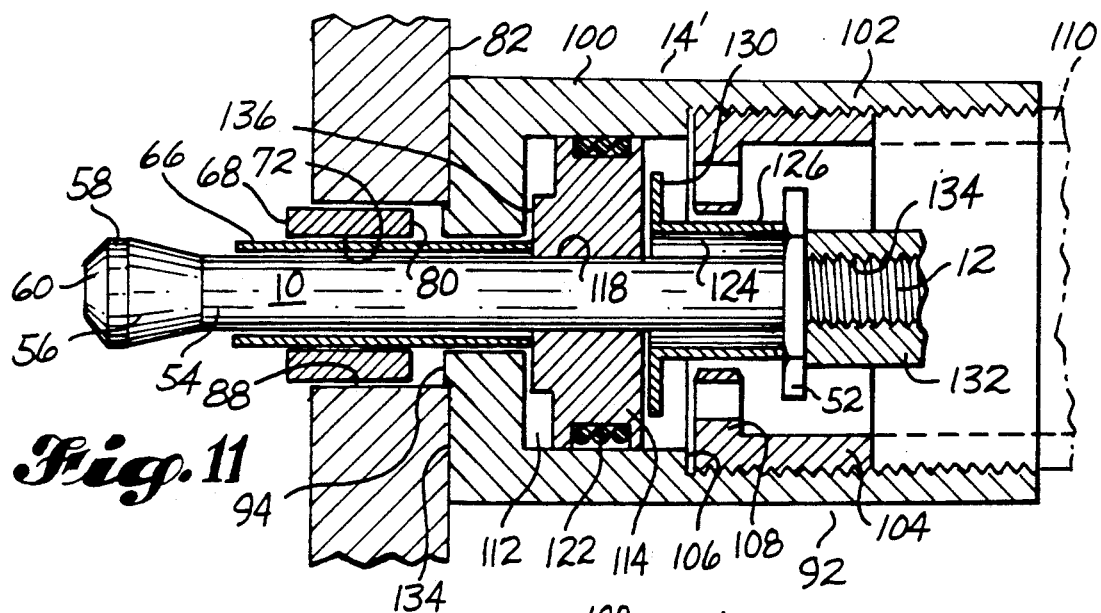
FIG. 11 is a view like FIG. 5, but showing the tooling of FIG. 10, and further showing the bushing in a start position which is spaced axially from the nosepiece of the puller gun.
Figure 12:
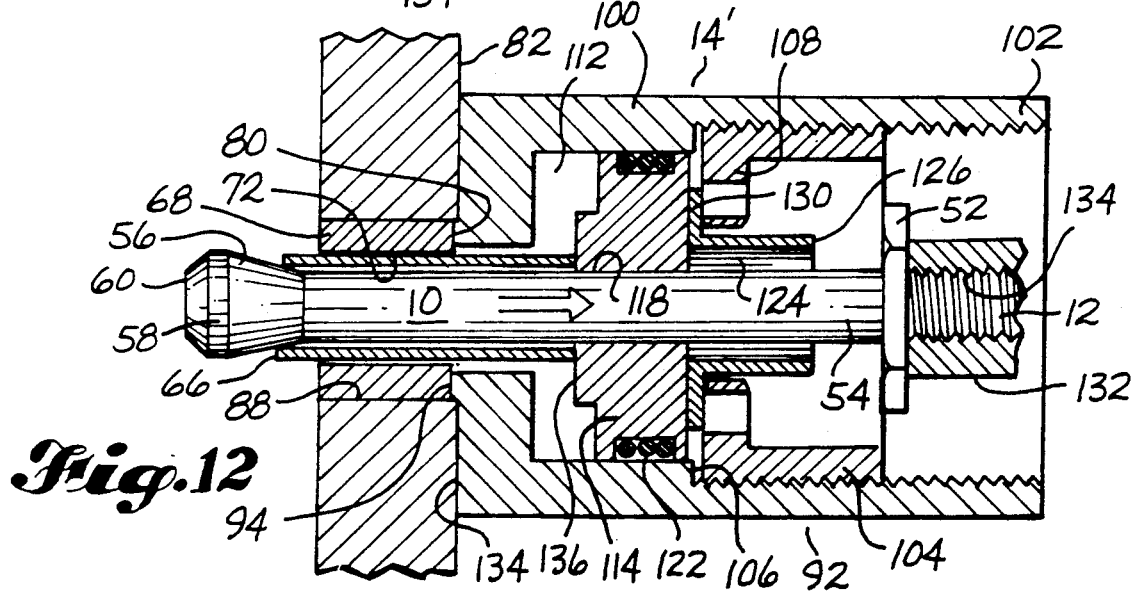
FIG. 12 is a view like FIG. 11, but showing the mandrel being retracted against the split sleeve and the bushing being repositioned in the wall opening.
Figure 13:
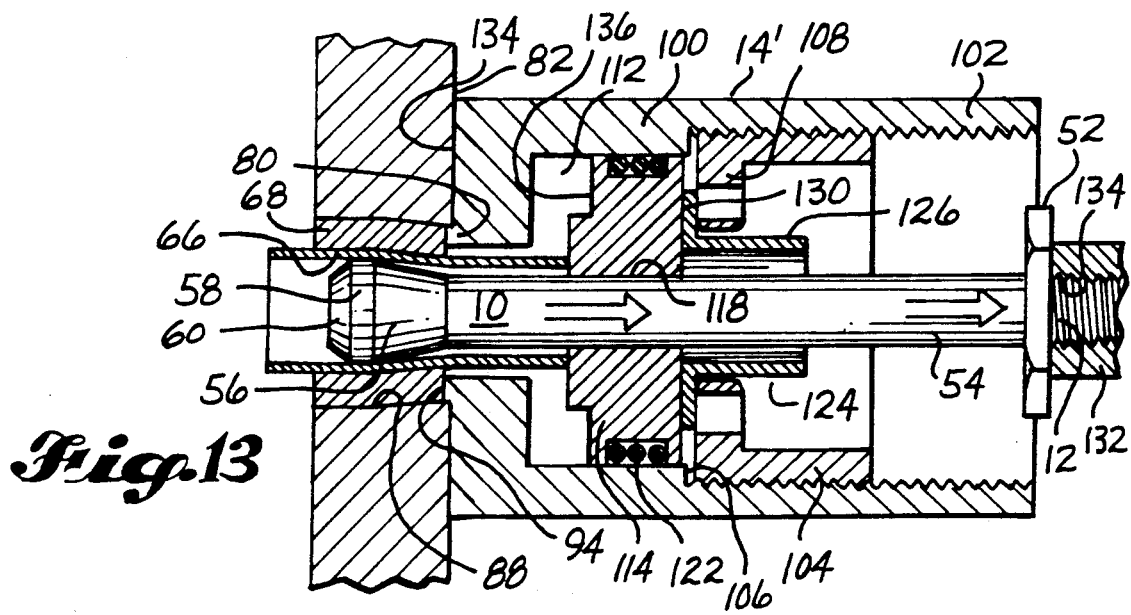
FIG. 13 is a view like FIGS. 11 and 12, but showing the large diameter portion of the mandrel moving through the split sleeve.

FIGS. 10-13 show a modified embodiment of the puller tool 14'. In this embodiment, the nosepiece 92 is in the form of a screw-on nose cap. Nosepiece 92 includes an annular bushing stop 94 which surrounds a central opening 96 in an end wall 98. Nosepiece 92 has a forward sidewall portion 100 and a rearward sidewall portion 102. The internal diameter of sidewall portion 102 is larger than the internal diameter of sidewall portion 100. Sidewall portion 102 is internally threaded. A retainer ring 104 is housed within nosepiece 92. Retainer ring 104 has external threads which mate with the internal threads of wall portion 102. A radial shoulder 106 is formed between forward portion 100 and rearward portion 102. Retainer ring 104 is screwed into the nosepiece 92 until its forward wall 108 contacts the shoulder 106, as shown in FIGS. 11-13. The puller gun barrel 110 (FIG. 11) is then threaded into nosepiece 92, behind retainer 104.

A chamber 112 is formed by sidewall 100 and end walls 98 and 108. A segmented sleeve stop 114 (e.g. three segments 116) is positioned within chamber 112. Sleeve stop 114 includes a central opening 118 and a peripheral groove 120 in which a plurality (e.g. three) elastomeric rings 122 are received. Stored energy in elastomeric rings 122 urge the segments 116 together.

A floating spacer ring 124 is positioned rearwardly of sleeve stop 114. Spacer ring 124 includes a cylindrical sidewall 126 which fits through a central opening 128 in the end wall 110 of retainer 106. Ring 124 also includes a radial flange 130 which at its front contacts a rear side portion of sleeve stop 114 and at its rear contacts retainer wall 110.

The puller tool 110 includes an internal coupler 132 which is at its rear end connected to a piston (not shown). Coupler 132 includes an internally threaded socket 134 at its forward end which mates with the threaded end 12 of mandrel 10. When mandrel 10 is connected to coupler 132, its flange 52 makes abutting contact with the forward end of coupler 132. For additional details of the puller tool, reference is made to the aforementioned U.S. Pat. No. 4,187,708.

The operation of the tooling shown by FIGS. 10-13, for installing a bushing 68 within a workpiece opening 88, will now be described. Firstly, the piston within the puller gun 110 is extended, so as to extend the mandrel 80. As shown by FIG. 11, when mandrel 10 is extended, the sleeve stop 114 is positioned forwardly in chamber 112. During extension of mandrel 10, flange 52 contacts and moves spacer sleeve 126 which in turn contacts and moves sleeve stop 114. Next, an internally lubricated split sleeve 66 is installed onto the small diameter portion 54 of the extended mandrel 10. Then, a bushing 60 is installed onto sleeve 66. Next, the forward end portion 60 of mandrel 10 is aligned with opening 88 and the puller tool 110 is moved forwardly until its end surface 134 is in contact with workpiece surface 82. When surfaces 134, 82 are in contact, the bushing abutment 92 extends a short distance into the workpiece opening 88.

FIG. 11 shows a typical situation which may exist at the start of operation. The bushing 68 is positioned forwardly of its desired position within workpiece opening 88. However, correct positioning of the bushing 68 is easily and quickly achieved. After end cap surface 134 has been placed in contact with workpiece surface 82, the puller gun is operated to retract the mandrel 10. As mandrel 10 is retracting, increasing diameter portion 56 of mandrel 10 contacts the outer end of sleeve 66 and moves sleeve 66 endwise against sleeve stop 114. The sleeve 66 and the sleeve stop 114 move into the nosepiece 92 until flange 130 is against wall 108 of retainer 104 and sleeve stop 114 is against flange 130. During this movement of sleeve 66, the bushing 68 is moved endwise towards abutment 94. This is because bushing 68 moves inwardly along with sleeve 66, owing to frictional contact between sleeve 66 and bushing 68. FIG. 12 shows the sleeve stop 114 against flange 130, flange 130 against retainer wall 108, bushing 68 against abutment 94, and the increasing diameter portion 56 of mandrel 10 starting its entrance into sleeve 66. Further retraction of mandrel 110 causes first the increasing diameter portion 56, and then the maximum diameter portion 58, of mandrel 10 to enter into and pass axially through the split sleeve 66. In the process, sleeve 66 is expanded in diameter to such an extent that it enlarges the diameter of bushing 68 and moves bushing 68 radially outwardly into a tight interference fit with workpiece opening 88. During this stage of retraction of mandrel 10 the split sleeve 66 is held against movement by its contact with forward end surface 136 on sleeve stop 114. Sleeve stop 114 is held against movement by its contact with flange 130. Spacer 124 is held against movement by contact of flange 130 with end wall 108. Bushing 68 is held against movement by contact of its end surface 80 with bushing abutment 94.

The preferred embodiment which has been illustrated and described, and the various alternative embodiments which have been described, are presented to provide a better understanding of the invention, but are not to by themselves limit the scope of protection. The scope of protection is to be determined by the claims which follow, interpreted in accordance with established rules of patent claim interpretation.

What is claimed is:

1. A method of installing a tubular bushing in a circular opening extending between first and second sides of a structural member, said circular opening having a cylindrical sidewall, said method comprising:

providing a mandrel of a type having, in series, a small diameter portion, an increasing diameter portion, and a maximum diameter portion;

providing a one piece split sleeve and positioning such sleeve on the small diameter portion of the mandrel;

providing a tubular bushing having a substantially constant outside diameter and a substantially constant inside diameter, said outside diameter being sized to snugly fit into the opening in the member, and said inside diameter being sized to pass the maximum diameter portion of the mandrel and the split sleeve when the split sleeve is on the small diameter portion of the mandrel;

inserting the mandrel, the split sleeve and the bushing into the opening in the member, with the split sleeve within the bushing;

holding the split sleeve in a fixed axial position within said bushing and said bushing in a fixed axial position within said opening while moving the mandrel axially to move first the increasing diameter portion and then the maximum diameter portion of the mandrel axially through the split sleeve, to in that manner expand the split sleeve radially and impose a radially outwardly directed expansion force on the bushing, to expand the bushing within said opening;

wherein the mandrel and the split sleeve are dimensioned such that the radial expansion of the split sleeve exerts sufficient radial forces on the bushing to plastically expand the bushing and place the sidewall of the opening into tight gripping contact with the outer surface of the bushing; and removing the split sleeve from the bushing after the mandrel has passed through the split sleeve, leaving the tubular bushing within said opening, firmly secured by the expansion to the sidewall of the opening.

2. A method according to claim 1, comprising providing a puller tool for the mandrel having a nosepiece into which the mandrel is received, said nosepiece having an outer end surface immediately surrounding the mandrel;

installing the bushing on the split sleeve by moving the bushing endwise over the maximum diameter portion of the mandrel, then over the increasing diameter portion of the mandrel, and then onto the split sleeve;

then inserting the mandrel, maximum diameter portion first, into the opening in the member, from the first side of the member, and moving the mandrel endwise until the split sleeve and the bushing are within the opening and the outer end surface of the nosepiece is against the bushing and the first side of the member; and then pulling the mandrel into the nosepiece while maintaining the end surface of the nosepiece against the split sleeve, the bushing and the first surface, to in that manner hold the split sleeve and bushing in the opening during movement of the mandrel.

3. A method according to claim 1, comprising using a bushing that is substantially equal in length to the thickness dimension of the member measured between the first and second sides of the member.

4. A method according to claim 3, comprising providing a puller tool for the mandrel having a nosepiece into which the small diameter portion of the mandrel is received, said nosepiece having an outer end surface immediately surrounding the mandrel;

installing the bushing on the split sleeve by moving the bushing endwise over the maximum diameter portion of the mandrel, then over the increasing diameter portion of the mandrel, and then onto the split sleeve;

then inserting the mandrel, maximum diameter portion first, into the opening in the member, from the first side of the member, and moving the mandrel endwise until the split sleeve and the bushing are within the opening and the end surface of the nosepiece is against the first side of the member; and then pulling the mandrel into the nosepiece while maintaining the end surface of the nosepiece against the split sleeve, the bushing and the first surface, to in that manner hold the split sleeve and bushing in the opening during movement of the mandrel.

5. Apparatus for installing a tubular bushing in a cylindrical opening in a member, said opening extending through the member from a first side to a second side, said bushing having an inside diameter, a first end and an outside diameter sized to snugly fit within said opening, said apparatus comprising:

a mandrel having in series, a small diameter portion, an increasing diameter portion, and a maximum diameter portion, said maximum diameter portion being sized to fit through the bushing;

a one piece split sleeve having an inside diameter sized to fit on the small diameter portion of the mandrel, and an outside diameter sized to fit through the bushing when the split sleeve is on the small diameter portion of the mandrel;

wherein in use the bushing is inserted into the opening in said member, the split sleeve is on the small diameter portion of the mandrel and is within the bushing; and means for holding the bushing and split sleeve against endwise movement while forcing the mandrel endwise, to move first the increasing diameter portion and then the maximum diameter portion of the mandrel axially through the split sleeve, to in that manner expand the split sleeve radially and impose a radially outwardly directed force on the bushing, to expand the bushing within said opening, wherein the mandrel and the split sleeve are so sized that the radial expansion of the split sleeve exerts sufficient radial forces on the bushing to plastically expand the bushing and place the sidewall of the opening into tight gripping contact with the outer surface of the bushing, whereby following movement of the mandrel through the split sleeve to expand the bushing to secure it in the opening, the split sleeve is removed from the bushing.

6. Apparatus according to claim 5, wherein the means for forcing the mandrel endwise comprises a puller tool having a nosepiece into which the small diameter portion of the mandrel is received, and means connected to the mandrel for pulling the mandrel endwise into the nosepiece, said nosepiece contacts both an end of the bushing and said member, while the mandrel is being pulled through the split sleeve into the nosepiece of the puller tool.

7. Apparatus according to claim 6, wherein said nosepiece is tubular and includes a central opening, and an outer end portion, said outer end portion including an annular end surface which contacts a surface portion of the member immediately surrounding the opening in the member, and an annular end portion immediately surrounding the opening in the nosepiece which contacts an end of the bushing.

8. Apparatus according to claim 7, wherein the annular portion of the nosepiece which contacts an end of the bushing projects axially from the end of the nosepiece beyond the annular surface that contacts the surface portion of the member which immediately surrounds the opening in the member.

9. Apparatus according to claim 8, wherein said means for holding the bushing and split sleeve against endwise movement includes a sleeve holder within the end piece having an outer end which makes abutting contact with the sleeve.

10. Apparatus according to claim 9, wherein the tubular nosepiece is a one piece tubular member and the sleeve holder is an axially split tubular member and an annular space exists between the nosepiece and the sleeve holder, said space permitting radial expansion of the sleeve holder in response to a retraction of the increasing and maximum diameter portions of the mandrel into the sleeve holder.

11. Apparatus according to claim 7, wherein said means for holding the bushing and split sleeve against endwise movement includes a sleeve holder within the end piece having an outer end which makes abutting contact with the sleeve.

12. Apparatus according to claim 11, wherein the tubular nosepiece is a one piece tubular member and the sleeve holder is an axially split tubular member and an annular space exists between the nosepiece and the sleeve holder, said space permitting radial expansion of the sleeve holder in response to a retraction of the increasing and maximum diameter portions of the mandrel into the sleeve holder.

13. Apparatus according to claim 5, wherein the means for holding the bushing and split sleeve against endwise movement comprises a nosepiece through which the mandrel extends, said nosepiece having an annular bushing abutment which surrounds the mandrel and is directed towards a confronting end of the bushing, and an end surface in contact with said member, and a sleeve stop within said nosepiece.

14. Apparatus according to claim 13, wherein said sleeve stop is a segmented annular member having a central opening through which the mandrel extends and a forwardly directed sleeve contacting surface.

15. Apparatus according to claim 14, wherein the sleeve stop is movable axially back and forth within said nosepiece between front and rear portions, and wherein said apparatus includes means which forces the sleeve stop forwardly in the chamber when the mandrel is extended.

16. Apparatus according to claim 15, wherein said means for moving the sleeve stop forwardly when the mandrel is extended comprises a spacer member having a forward end positioned to contact the sleeve stop and a rear end positioned to be contacted by a portion of the mandrel when the mandrel is extended.

17. Apparatus according to claim 15, wherein contact between the mandrel and a confronting end of the split sleeve, during initial retraction of the mandrel, will move the split sleeve rearwardly against the sleeve stop and will then move the sleeve and sleeve stop rearwardly together until the sleeve stop reaches a rear position, and wherein during further retraction of the mandrel the sleeve stop will hold the sleeve against further endwise movement.

18. Apparatus according to claim 17, wherein said split sleeve and bushing are sized to make a frictional fit, each with respect to the other, and during the initial retraction of the mandrel the bushing will move with the split sleeve until its end surface contacts the bushing abutment.

19. Apparatus according to claim 18, wherein the bushing abutment projects into the workpiece opening from the workpiece surface which is in contact with the nosepiece surface.

* * * * *